March 18, 1947.  H. T. HERBST  2,417,412
APPARATUS FOR CUTTING TUBES
Filed Jan. 29, 1944  3 Sheets-Sheet 1

INVENTOR
HARRY T. HERBST
BY
ATTORNEY

March 18, 1947. H. T. HERBST 2,417,412
APPARATUS FOR CUTTING TUBES
Filed Jan. 29, 1944 3 Sheets-Sheet 2
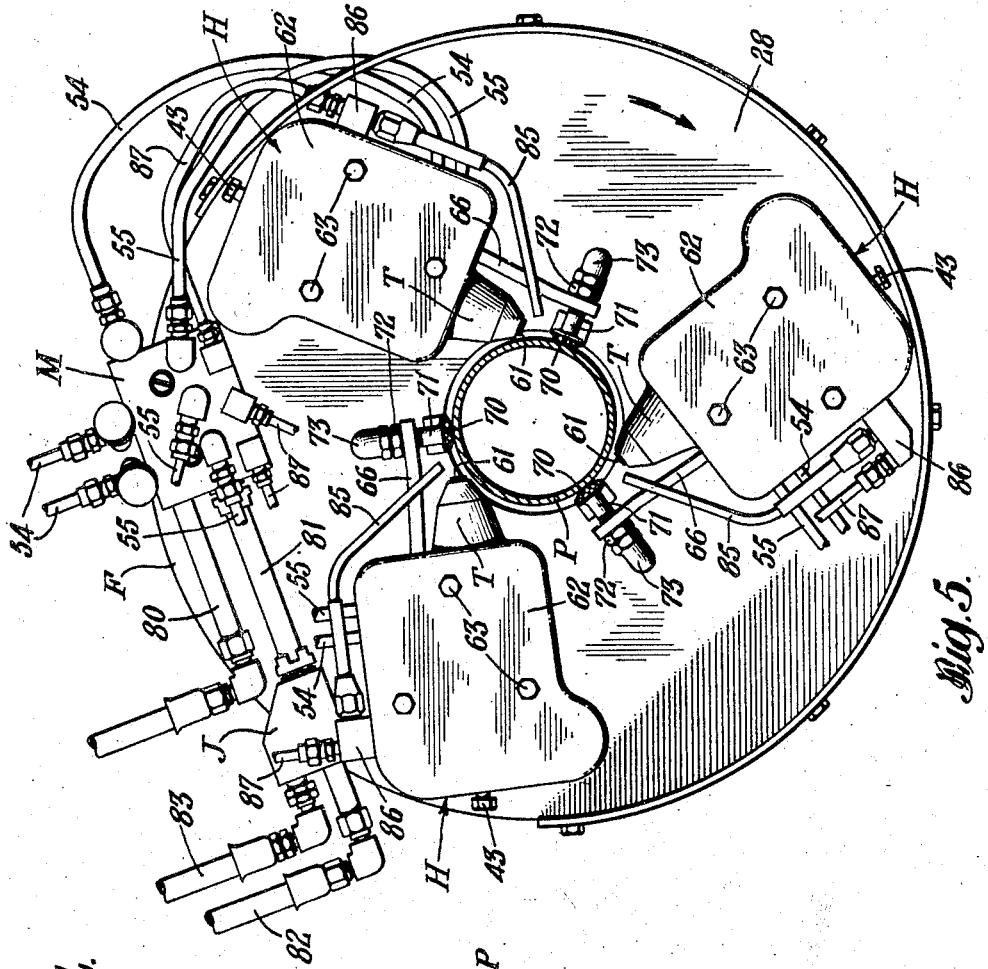
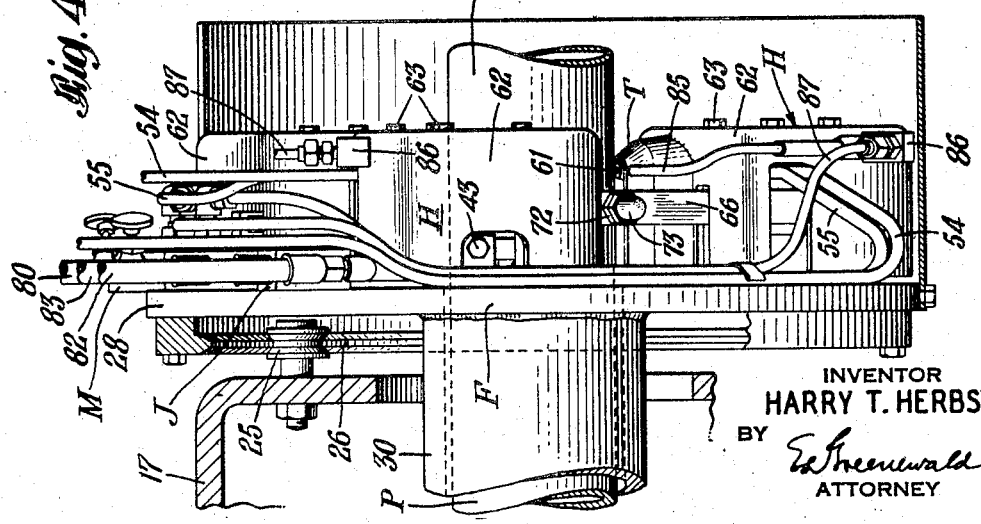
INVENTOR
HARRY T. HERBST
BY
ATTORNEY

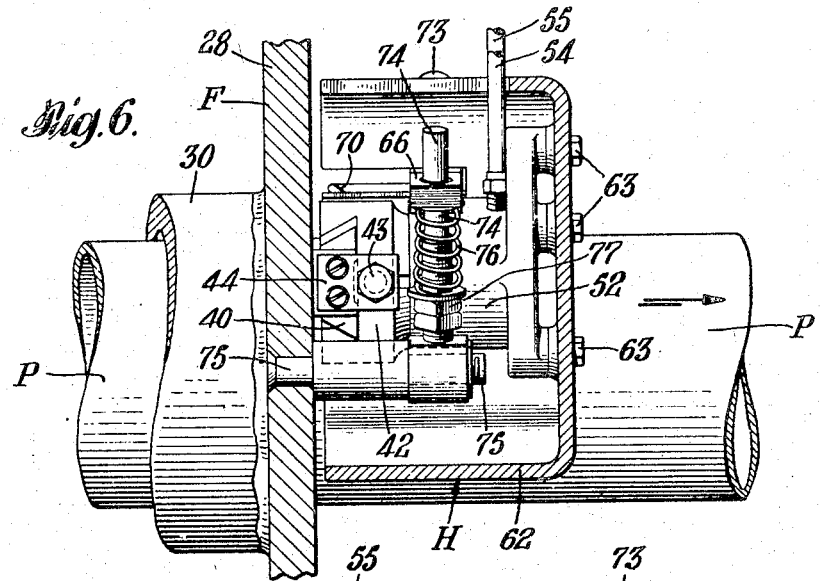

Patented Mar. 18, 1947

2,417,412

UNITED STATES PATENT OFFICE 2,417,412

APPARATUS FOR CUTTING TUBES

Harry T. Herbst, Baltimore, Md., assignor to Union Carbide & Carbon Corporation, a corporation of New York Application January 29, 1944, Serial No. 520,246.

8 Claims. (Cl. 266—23)

This invention relates to apparatus for cutting a tube, particularly adapted for rapidly cutting tubing while in motion, generally during the operation of manufacturing the tube and constitutes an improvement upon the apparatus disclosed in the copending application of Frank C. Geibig, Serial No. 515,507, filed December 24, 1943.

The main object of the present invention is to provide improved apparatus for carrying out the tube severing method disclosed in said Geibig application, which method comprises projecting a stream of cutting oxygen tangentially of the inner cylindrical surface of the tube while the latter and the nozzle which delivers the cutting stream are rotated relatively to one another about the axis of the tube. This severing operation is preferably accomplished by a blowpipe nozzle positioned to impinge its heating flames obliquely against the outside surface of the tube, and to project a stream of cutting oxygen tangentially of the inner cylindrical surface of the tube to form a kerf tangential to such inner surface and extending through the wall of said tube, so that the resulting molten iron and oxides are blown through the kerf to the outside of the tube, thereby obtaining a smooth kerf free from imperfections, and leaving the inside of the tube free of slag accumulation, and the tube and nozzle with its cutting stream and heating flames are relatively rotated about the axis of the tubing to extend the kerf circumferentially of the tube.

It is another object of the present invention to provide means for maintaining such tangential relation of the cutting oxygen stream and the tube during such relative rotation thereof about the longitudinal axis of the tube, preferably automatically by means associated with the cutting nozzle and arranged to engage the external surface of the tube in riding contact therewith so that, regardless of the diameter or roundness of the tube, the cutting stream will continue to cut a kerf through the wall of the tubing and blow the molten iron and oxides through the kerf to the outside of the tube as the kerf is extended circumferentially of the tube.

Further objects are to provide means for pivotally supporting the blowpipe nozzle with respect to a frame member having an aperture through which the tube passes; to provide work engaging means rigid with the blowpipe nozzle as a unit; to provide a spring bearing against an abutment on said frame member and urging said unit about its pivot, and to provide means for moving the blowpipe nozzle longitudinally of the cutting oxygen stream, preferably by moving said pivot.

Other objects and features of novelty will become apparent as the following description proceeds, with reference to the accompanying drawings, in which:

Figs. 4 and 5 are, respectively, a side view and an end view of the blowpipes and their supporting structure, and the mixer and manifold for distributing combustible mixture to the preheat flames and the auxiliary flames of the blowpipes, the casing being shown in section in Fig. 4;

Fig. 6 is a view, partly in elevation and partly in section, of a blowpipe support, showing its internal construction, particularly the slide, for mounting the blowpipe support for adjustment to different diameters of tubes;

Fig. 7 is a section taken along the line 7—7 of Fig. 8; and,

Fig. 8 is a section taken along the line 8—8 of Fig. 7, these views showing the pivotal mounting of the blowpipe support and the work-engaging means.

Figure 1:
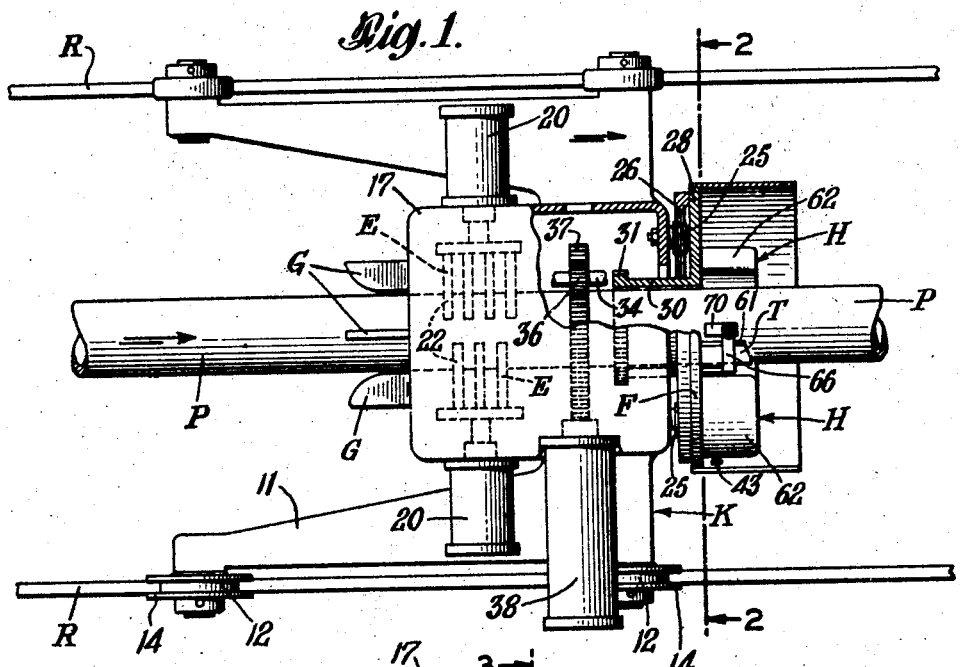
Fig. 1 is a plan view of a carriage for supporting the tube and cutting nozzles in desired relation for cutting the tube on the run as it is delivered by the forming machine.
Figure 2:
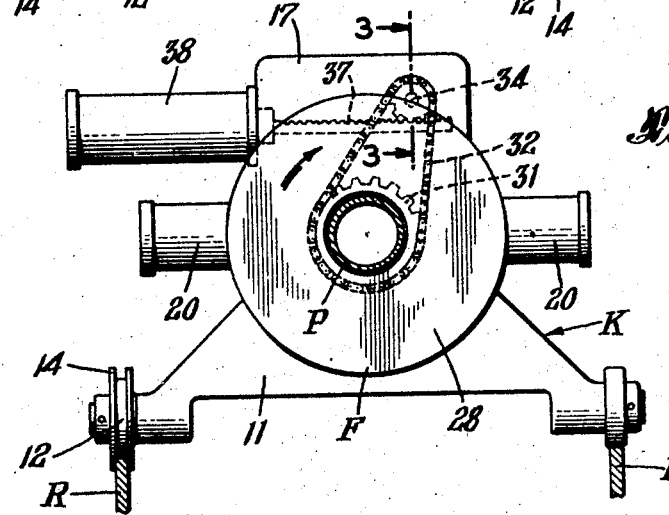
Fig. 2 is a vertical transverse section taken along the line 2—2 of Fig. 1, showing the mechanism for rotating the blowpipe carrier and blowpipes about the longitudinal axis of the tube.

The principles of this invention are embodied in a machine for cutting a tube into sections of desired length without interrupting the continuity of the operation of manufacturing the tube, as where the finished tube emerges lengthwise of its axis and continuously from the tube drawing or forming and welding apparatus. This machine includes a carriage K movable a suitable distance back and forth along rails R arranged parallel to the longitudinal axis of the tube P. A frame member F having an aperture through which the tube P passes, is rotatably mounted on the carriage K for rotation about the tube axis. A plurality of equally spaced blowpipe holders H are mounted on the rotary frame member F. Cutting blowpipes T (3 in the illustrated machine best shown in Fig. 5) are carried by the blowpipe holders H mounted on the rotary frame member F carried by the carriage K, and are positioned equal distances apart around the path of the tube and so that their heating flames and cutting oxygen streams will impinge obliquely against the outside surface of the tube.

The carriage K has guides G to guide and center the cutting machine relatively to the tube, and also has grippers E automatically operable to clamp the carriage to the tube, so that the tube and the carriage with the torches thereon will advance together at the same rate of speed during the severing operation.

Upon completion of the severing operation, the grippers are automatically released, the carriage is retracted a predetermined distance lengthwise of the tube while being guided and centered by guides G, and then is automatically reclamped by the grippers E, whereupon the blowpipe flames are re-ignited, the cutting oxygen streams turned on, and the carriage again advances with the tube to repeat the severing operation, which latter is completed by the time or before the tube and the carriage together travel a distance equal to the desired length of tube section. To completely sever the tube in the present instance, requires only one-third of a revolution of each blowpipe about the tube, whereupon the gas supplied to the heating gases and the oxygen streams, but not the pilot light, is shut off, the grippers E are released, and the carriage is retracted along the advancing tube to the next cutting position.

In the illustrated example of the invention the parallel rails R are disposed below the horizontal path of travel of the tube P, the rails being horizontally and equally spaced from the longitudinal axis of the tube P. The carriage K is mounted to travel on the rails R in the direction of movement of the tube P, preferably as the latter is produced, and also in the opposite direction for return.

The carriage K comprises a frame 11 near the four corners of which wheels 12 are provided to roll on the rails R, the wheels having flanges 14. The carriage K also embodies a casing 17 provided with the entrance guides G through which the tube P passes. Centralizing and clamping cylinders 20 mounted on the casing 17 serve to operate internal clamping jaws 22, which when in engagement with the tube P, cause the carriage K to move with the tube P while supported on the rails R.

Figure 3:
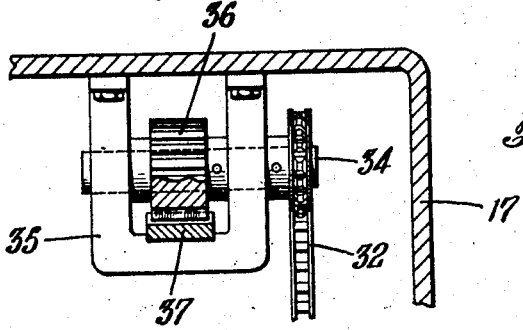
Fig. 3 is a section taken along the line 3—3 of Fig. 2, showing a detail of the gearing for rotating the blowpipe carrier.

The exit end of the casing 17 has journaled thereon a plurality of grooved rollers 25, which receive an internal annular flange 26 of a blowpipe carrier frame member 28 having a central circular aperture through which the tube extends. The rollers 25 are equi-distant from the longitudinal centerline of the path of the tube, and center the frame member 28 with respect thereto, while permitting rotation about such center line. Coaxially secured to the frame member 28, for example mounted on a hub 30 thereof, is a sprocket 31, connected as shown in Fig. 3 by a chain 32 to a sprocket pinion keyed to a shaft 34 journaled in a hanger 35 secured inside the casing 17. A spur pinion 36 keyed on the shaft 34 meshes with a rack 37 driven by a hydraulic cylinder 38 for rotation of the blowpipe carrier frame member 28.

As shown in Figs. 4 and 5, the frame member or plate 28 has mounted thereon the plurality of equally spaced blowpipe holders H, three being shown, but a larger or smaller number may be employed as desired. Each of the blowpipe holders H carries an oxy-gas cutting blowpipe. These blowpipes are severally supplied with gases from a manifold M, which receives cutting oxygen from a supply pipe 80, and receives a combustible preheating gas mixture through the tube 81 from a mixer J, the latter in turn receiving oxygen from a supply pipe 82, and acetylene from a supply pipe 83.

Inasmuch as the blowpipe holders H and the supply of gases to each from the manifold are identical, a description of one of the blowpipe holders and its gas supply means will suffice. As shown in Figs. 6, 7 and 8, the blowpipe holder is supported on a base block 40 which is bolted to the plate 28. A slide 42 is provided with an undercut groove engaging dovetail sides of the base block. The position of the slide is adjusted by a screw 43 swivelled in the slide, and passing through a nut 44 secured to the base block, a lock nut 45 being provided if desired. A stop 46 on the slide 42 engages the block 40 to limit the outward movement of the slide.

The slide 42 carries a stud 50 on which is pivotally mounted a blowpipe block 52, retained on its pivot by a cap screw 53. A cutting oxygen supply conduit 54 and a preheat mixture supply conduit 55 are secured to the block 52 and are connected by suitable passages in said block to the central cutting oxygen passage and the adjoining preheating gas passages, respectively, of a blowpipe nozzle 61 secured to said block by the nut 60. A removable cover 62 is secured to the top of the blowpipe block 52, by screws 63.

A combustible gas conduit 85 terminates in front of the outlet nozzle 61, in position to direct a pilot flame onto the tube P in the path of the heating jets from the nozzle 61. This flame burns continuously, so as to ignite the preheating gas jets from the nozzle when such gas is turned on for the cutting operation. The pilot flame is small, and the tube P is generally in motion except during the cutting operation, so that there is no danger of burning the tube. However, the preheating flames from the nozzle 61 are inefficient due to their disposition tangentially to the tube P, so that the preheating effect of the pilot flame from the conduit 85 is of great advantage during the cutting operation, and definitely increases the cutting speed. As shown in Fig. 5, the conduit 85 is carried by a lug 86 suitably mounted on the blowpipe holder H so as to move with the nozzle. The lug 86 is connected by a tube 87 to the manifold M, to receive preheat mixture therefrom.

Adjustably secured to the side of the blowpipe block 52 is a tube rider arm 66, having an elongated slot 67 receiving set screws 68 to permit longitudinal adjustment. The front end of the arm 66 carries a tube rider 70, which has a surface of wear and heat resisting material such as a cobalt-chromium-tungsten metal alloy adapted to engage and slide circumferentially on the tube P during a cutting operation and also constructed and arranged to engage and slide longitudinally on the tube when the carriage K is retracted lengthwise of the tube to a succeeding cutting position. By virtue of its constant sliding contact with the outside surface of the tube, the tube rider 70 through its arm 66 will compensate for surface irregularities of the tube by rocking the nozzle-supporting block 52 in a plane perpendicular to the longitudinal axis of the tube and thereby will maintain the nozzle 61 in proper cutting position and also will locate the nozzle in proper position to start each cutting operation. The tube rider has a stem 71 threaded in the end of the arm 66, secured by a lock nut 72 and covered by a cap nut 73. The rear end of the tube rider arm 66 is apertured to receive a rod 74 pivoted on a stud 75 secured to the carrier plate 28. A spring 76 on the rod 74 under the arm 66, bears against an adjusting nut 77.

Looking at Fig. 7 in which the full line showing is adjusted for operation upon the full line tube P, in order to adjust the blowpipe holder for the smaller size tube shown in dotted lines, screws 63 and cover 62 are removed, and the screws 68 loosened to permit the arm 66 to slide with respect to the blowpipe block 52. The screw 43 is then turned inwardly, moving the slide 42 inwardly on the base 40. This moves the pivot 50 toward the tube, but the stud 75 remains stationary, and the rod 74 maintains its right angle relation to the arm 66. As a result, inward movement of the slide 42 and its stud 50 causes a downward movement of the blowpipe block about its pivot 50, and a downward movement of the tube rider 70; but the retaining action of the rod 74 causes relative rearward movement of the arm 66 with respect to the block 52. In consequence, the nozzle tip and the tube rider are advanced and lowered to the dotted position, in which the jet from the nozzle is tangent to the inner wall of the smaller tube. After such adjustment the screws 68 are tightened and the cover 62 and screws 63 replaced.

The tube rider not only positions but also protects the cutting nozzle, because any circumferential or longitudinal irregularities in the tube which might strike the nozzle, will first engage the tube rider, which slides outwardly, compressing the spring 76, but carrying the blowpipe block 52 outwardly with it.

While the invention has been illustrated and described in such detail as to enable any one skilled in the art to practice the invention, nevertheless it is to be understood that the invention is not to be limited to the precise details disclosed. Instead, the invention is to be construed to embrace such modifications of the broad idea as fall within the scope of the subjoined claims, in which the term "tube" embraces pipes and other hollow enlongated forms, regardless of diameter, wall thickness, shape or material.

What is claimed is:

1. Apparatus for cutting a tube comprising, in combination, a frame member having an aperture through which the tube extends; a block pivotally mounted on said frame member; a tube rider arm slidably secured to said block for longitudinal movement toward and away from said tube in a plane offset from the pivot of said block; a tube rider on said arm for engaging the outside surface of said tube; and a cutting nozzle secured to said block in position to project a stream of cutting oxygen substantially parallel to a tangent to the tube in a plane perpendicular to the longitudinal axis of the tube adjacent the point on the tube engaged by said tube rider.

2. Tube cutting apparatus comprising, in combination, a movable carriage; means supporting said carriage for movement in opposite directions parallel to the longitudinal axis of the tube; a rotatable frame member having an aperture through which the tube extends; means mounting said frame member on said carriage for rotation about said tube axis; a movable slide mounted on said frame member and movable toward and away from said aperture; a nozzle support pivotally mounted on said slide and rockable in a plane perpendicular to said tube axis; a cutting nozzle secured to said support in position to direct a cutting oxygen stream against said tube; means on said carriage operable to rotate said frame member about said tube axis while said carriage moves in one direction; means for maintaining said nozzle in said position comprising a tube rider secured to said nozzle support and arranged to constantly engage the outside surface of said tube during the movements of said carriage and the rotation of said frame member; and means for moving said slide relatively to said frame member and toward and away from said aperture to locate said nozzle for cutting tubes of different diameters.

3. Tube cutting apparatus comprising, in combination, a frame member having an aperture through which the tube extends; a slide mounted on said frame member and movable toward and away from said aperture; a nozzle support pivotally mounted on said slide and rockable in a plane perpendicular to the longitudinal axis of said tube; a cutting nozzle secured to said support in position to direct a stream of cutting oxygen against the tube and substantially parallel to a tangent to the inner surface of the tube in a plane perpendicular to the longitudinal axis of the tube; means for maintaining said nozzle in said position comprising a tube rider adjustably secured to said support and arranged to engage the outer surface of the tube; and means for moving said slide relatively to said frame member toward and away from said aperture.

4. Tube cutting apparatus comprising, in combination, a frame member having an aperture through which the tube extends; a nozzle support pivotally connected to said frame member and rockable in a plane perpendicular to the longitudinal axis of said tube; a cutting nozzle secured to said support in position to project a stream of cutting oxygen against the tube and substantially parallel to a tangent to the inner surface of the tube in a plane perpendicular to the longitudinal axis of the tube; a tube rider secured to said nozzle support and movable therewith about the pivot of said support to maintain said nozzle in said position; an abutment on said frame member; and a spring bearing against said abutment and cooperating with said tube rider to yieldingly urge the latter against the outer surface of the tube.

5. Tube cutting apparatus comprising, in combination, a frame member having an aperture through which the tube extends; a block adjustably mounted on said frame member; a cutting nozzle secured to said block in position to project a heating flame obliquely against the outer surface of the tube and to direct a stream of cutting oxygen against the tube and substantially parallel to a tangent to the inner surface of the tube in a plane perpendicular to the longitudinal axis of the tube; a conduit secured to said block in position to direct an auxiliary heating flame against the outer surface of the tube in the path of the heating flame from said nozzle; and a tube rider positioned to engage the outer surface of the tube adjacent the area thereon heated by both of such heating flames and secured to said block to move the latter and both said nozzle and said conduit in response to irregularities of the outer surface of the tube.

6. Tube cutting apparatus comprising, in combination, a frame member having an aperture through which the tube extends; a plurality of blocks pivotally mounted on said frame member in angularly spaced relation about and equidistant from said aperture; tube rider arms severally secured to and movable with said blocks about the pivots of the latter; tube riders, one on each of said arms, for engaging the tube at angularly spaced points on its periphery; cutting nozzles severally secured to said blocks in position to project their heating flames obliquely against the outside surface of the tube and to direct their cutting oxygen streams against the tube and substantially parallel to tangents to the inner surface of the tube in a plane perpendicular to the longitudinal axis of the tube adjacent the points on said tube engaged by such tube riders; a gas mixer mounted on said frame member; and a manifold mounted on said frame member and connecting said mixer to said nozzles, to distribute a combustible gas mixture to all of said nozzles to supply their heating flames.

7. In apparatus for cutting a tube while the latter is continuously propelled lengthwise of its axis, a carriage movable at the same rate of speed as said tube lengthwise of said axis in a forward direction during a cutting operation and, after completing a cutting operation, movable in a reverse direction to locate said carriage relatively to the continuously propelled tube to start a succeeding cutting operation; a rotatable frame member mounted on said carriage and having an aperture through which the tube extends; a nozzle support pivotally mounted on said frame member to rock in a plane perpendicular to the tube axis; a cutting nozzle secured to said support in a position to direct a stream of cutting oxygen against said tube; means for rotating said frame member and said nozzle about said tube axis during a cutting operation; and a tube rider secured to said nozzle support and arranged to constantly slidably engage the outer surface of the tube, and slidable circumferentially on the tube to maintain said nozzle in said position during a cutting operation and also slidable lengthwise on said tube during such reverse movement of said carriage to locate said nozzle in said position to start a succeeding cutting operation.

8. Apparatus for cutting a tube while the latter is continuously propelled lengthwise of its axis, such apparatus comprising a carriage movable in opposite directions lengthwise of said axis and having clamping means thereon operable to secure said carriage to said tube for movement therewith in a forward direction during a cutting operation, said clamping means being releasable upon the completion of a cutting operation to permit movement of said carriage in a reverse direction lengthwise of such moving tube to locate said carriage for a succeeding cutting operation; a frame member mounted on said carriage and rotatable about such tube axis and having an aperture through which the tube extends; means operable to rotate said frame member about said axis during a cutting operation; a slide mounted on said frame member and adjustable toward and away from said aperture; a nozzle support pivotally mounted on said slide to rock in a plane perpendicular to said tube axis; a cutting nozzle secured to said support in a position to direct a stream of cutting oxygen against the tube and substantially parallel to a tangent to the inner surface of the tube in a plane perpendicular to said tube axis; a tube rider adjustably secured to said nozzle support and arranged to constantly slidably engage the tube, and slidable circumferentially on the tube to maintain said nozzle in said position during a cutting operation and also slidable lengthwise on said tube during such reverse movement of said carriage to locate said nozzle in said position to start a succeeding cutting operation; and adjustable means for locating said nozzle and said tube rider to cut tubes having different diameters, said adjustable means including means for adjusting said slide toward and away from said aperture and means operable to change the position of said tube rider relatively to said nozzle support.

HARRY T. HERBST.

REFERENCES CITED

The following references are of record in the file of this patent:

UNITED STATES PATENTS

| Number | Name | Date |
|---|---|---|
| 1,143,677 | Winans | June 22, 1915 |
| 2,125,178 | Ullmar | July 26, 1938 |
| 866,866 | Jottrand | Sept. 24, 1907 |
| 2,289,968 | Jones | July 14, 1942 |
| 1,705,923 | Irvin et al. | Mar. 19, 1929 |
| 1,852,413 | Hickey | Apr. 5, 1932 |
| 1,861,923 | Jones et al. | June 7, 1932 |
| 1,879,346 | Lawrence | Sept. 27, 1932 |
| 1,930,295 | Von Henke | Oct. 10, 1933 |
| 2,221,788 | Doyle | Nov. 19, 1940 |
| 2,223,452 | Jones et al. | Dec. 3, 1940 |
| 1,698,154 | Day | Jan. 8, 1929 |
| 1,915,912 | Anderson | June 27, 1933 |

FOREIGN PATENTS

| Number | Country | Date |
|---|---|---|
| 800,507 | French | July 7, 1936 |
| 474,033 | British | Oct. 21, 1937 |